United States Patent Office 3,196,169
Patented July 20, 1965

3,196,169
AMINOACYL AMINOSTEROIDS
Harvey E. Alburn, West Chester, and Norman H. Grant, Wynnewood, Pa., assignors to American Home Products Corporation, New York, N.Y., a corporation of Delaware
No Drawing. Filed Nov. 3, 1964, Ser. No. 408,679
11 Claims. (Cl. 260—397.3)

This application is a continuation-in-part of copending application Serial No. 345,574, filed February 18, 1964, now abandoned.

This invention is directed to novel aminosteroids and more particularly to 3α-(carboxamido)-5α-pregnan-20-ones and 3α-(carboxamido)-5α-pregnan-20-ols and to the method by which these new steroids are prepared.

The new compounds of the present invention considered in their broadest aspect include those encompassed within the following structural formula:

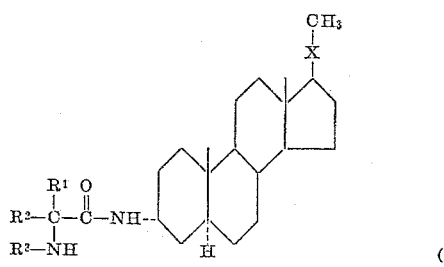

(I)

wherein $R^1$ represents a member of the group consisting of hydrogen and lower alkyl; $R^2$ represents a member of the group consisting of hydrogen, lower alkyl, phenyl, lower alkyl phenyl, phenyl lower alkyl, and the radical

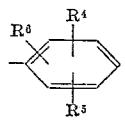

in which $R^4$, $R^5$ and $R^6$ each is a member selected from the group consisting of hydrogen, nitro, di(lower) alkylamino, (lower) alkanoylamino, (lower) alkanoyloxy, (lower) alkyl (including straight and branched chain saturated aliphatic groups having from 1 to 6 carbon atoms inclusive), (lower) alkoxy, sulfamyl, chloro, iodo, bromo, fluoro and trifluoro-methyl; and the nontoxic acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate oxalate, succinate, benzoate, tartrate, fumarate, malate, mandelate, ascorbate and the like. The α-carbon atom of the acyl group (to which the α-amino group is attached) may be an asymmetric carbon atom and the compounds of this invention can therefore exist in two optically active isomeric forms [the D- and the L- diastereoisomers], as well as in the optically inactive DL form which is a mixture of the two optically active forms; $R^1$ and $R^2$ taken together are cycloalkyl having from 2 to 8 carbon atoms; $R^3$ represents a member of the group consisting of hydrogen, lower alkyl, dialkylaminoalkyl, phenyl, lower alkyl phenyl and phenyl lower alkyl; X represents a member of the group consisting of

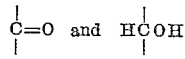

Among the methods for preparing novel compounds of the present invention is the condensation of a 2,5-oxazolidinedione with a steroid selected from the group consisting of funtumine and funtumidine. The reaction by which the new compounds of the present invention are prepared is represented as follows:

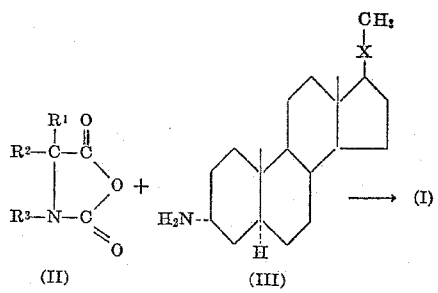

in which the substituents shown have the values previously ascribed with respect to compound I.

The reactants used in preparing new steroids of the present invention, generally represented by II and III above, are known to those skilled in the art or are obtainable by processes known to the art. The preferred starting material represented by II, is a substituted -2,5-oxazolidinedione, where hereinafter may also be identified as an N-carboxy amino acid anhydride. It will be noted that substitution may be at both the 3 and 4 positions of the oxazolidinedione including disubstitution at the 4 position as shown.

These substituted oxazolidinediones may be prepared by any one of several routes including (a) the carboalkoxy method, (b) the azide rearrangement or the (c) phosgenation procedure. The preferred method is the latter in which the amino acid reactant is dissolved or suspended in dioxane, phosgene is introduced into the reaction mixture and the resulting anhydride is crystallized by the addition of an agent such as benzene.

The steroidal reactant III, namely funtumine or funtumidine, is prepared according to the method described in Compt. rend, Acad. Sci. 240, 3076, 1958.

In the preferred method of the present invention, the substituted 2,5-oxazolidinedione is reacted with funtumine or funtumidine in the presence of an inert solvent such as dioxane, at a temperature of from 5° to about 50° C. and preferably from about 15° to about 30° C. for a period of from about ½ to about 40 hours. At the end of the reaction period, several volumes of water are added to the reaction mixture, such as for example two to four volumes of water, and an oily product separates. This product, the new and desired steroid, may then be worked up in a conventional manner by drying, redissolving in solvent, reprecipitating by the addition of water and then chilling. The steroid separates as a colorless crystalline product.

The new steroids of the present invention have been found to possess valuable and useful properties including specifically antimicrobial properties. The compounds are therefore useful for this purpose and have been found to be particularly effective agents against *B. subtilis*, *S. aureus* and *Brucella bronchiseptica*.

The method of the present invention and the products obtainable thereby will be more clearly understood by reference to the following examples:

*Example 1*

A mixture of 2 grams of funtumine and 972 mg. of N-carboxy-1-aminocyclopentanecarboxylic acid anhydride is stirred in 25 ml. of dioxane at 25° C. for 24 hours. Four volumes of water are added and an oil separates. This is removed, dried, redissolved in dioxane, reprecipitated with water, and chilled, giving 620 mg. of crystalline product. The dioxane-water solution, which remains after removal of the oil, gives on chilling 250 mg. of crystalline product. The product, 3α-(1-aminocyclopentanecarboxamido)-5α-pregnan-20-one, shows the following analysis:

Calc'd for $C_{27}H_{44}O_2N_2$: C, 75.6; H, 10.3; N, 6.5. Found: C, 74.7; H, 10.0; N, 6.4.

*Example II*

To prepare 3α-(1-aminocyclopropanecarboxamido)-5α1pregnan-20-ol, N-carboxy-1-aminocyclopropanecarboxylic acid anhydride is reacted with funtumidine according to the method of Example I.

*Example III*

Following the procedure of the previous examples, N-carboxy-1-aminocyclobutanecarboxylic acid anhydride is reacted with funtumine to produce 3α-(1-aminocyclobutanecarboxamido)-5α-pregnan-20-one.

Following the procedure of the previous examples, if one reacts, 3,4,4-trimethyl-2,5-oxazolidinedione, 4-phenyl-2,5-oxazolidinedione or 4-tolyl-2,5-oxazolidinedione with funtumine, one will obtain 3α-(2-methyl-2-methylaminopropionamido)-5α-pregnan-20-one, 3α-(2-amino-2-phenylacetamido)-5α-pregnan-20-one and 3α-(2-amino-2-tolylacetamido)-5α-pregnan-20-one respectively. Similarly, by reacting 4-(2,5-dichlorophenyl)-2,5-oxazolidinedione, 4-(o-nitrophenyl)-2,5-oxazolidinedione, 3-ethyl-4-isopropyl-4-methyl-2,5-oxazolidinedione or 3-phenyl-4,4-dimethyl-2,5-oxazolidinedione with funtumidine, one obtains 3α-[2-amino-2-(2,5-dichlorophenyl-acetamido]-5α-pregnan-20-ol, 3α[2-amino-2-(o-nitrophenyl)acetamido]-5α-pregnan-20-ol, 3α-(2-ethylamino-2,3-dimethylbutyramido)-5α-pregnan-20-ol and 3α-(2-anilino-2-methylpropionamido)-5α-pregnan-20-ol respectively.

*Example IV*

Following the procedure of Example I, N-carboxy-1-aminocyclooctanecarboxylic acid anhydride is reacted with funtumidine to produce 3α-(1-aminocyclooctanecarboxamido)-5α-pregnan-20-ol.

Following the procedure of previous examples, if one reacts 3-(o-ethylphenyl)-2,5-oxazolidinedione, 3,4,4-tributyl-2,5-oxazolidinedione or 3,5-diphenyl-2,5-oxazolidinedione with funtumine, there is produced 3α-[2-(o-ethylanilino)-acetamido]-5α-pregnan-20-one, 3α-(2-butyl-2-butylaminohexaneamido)-5α-pregnan-20-one and 3α-(2-anilino-2-phenylacetamido)-5α-pregnan-20-one respectively. Similarly, if 3-ethyl-4-phenyl-2,5-oxazolidinedione, 3-propyl-2,5-oxazolidinedione or 3-(2-dimethylaminoethyl)2,5-oxazolidinedione is reacted with funtumidine, there is produced 3α-(2-ethylamino-2-phenylacetamido)-5α-pregnan-20-ol, 3α-(2-propylaminoacetamido)-5α-pregnan-20-ol and 3α-[2-(2-dimethylaminoethylamine)acetamido]-5α-pregnan-20-ol respectively.

*Example V*

To prepare 3α-(1-aminocycloheptanecarboxamido)-5α-pregnan-20-one, N-carboxy-1-aminocycloheptanecarboxylic acid anhydride is reacted with funtumine according to the method of Example I.

*Example VI*

A solution consisting of 1 gram of the N-carboxyanhydride of N-phenylglycine and 1.8 grams of funtumine in 35 ml. of dioxane is allowed to stand at room temperature for 4 hours. The solvent is removed by sublimation. The residue of 3α-(2-anilinoacetamido)-5α-pregnan-20-one is washed with ethyl acetate, crystallized from ethanol, and washed with acetone. M.P. 163–175°.

*Analysis.*—Calcd. for $C_{29}H_{42}O_2N_2$: C, 77.4; H, 9.3; N, 6.2. Found: C, 76.7; H, 9.2; N, 6.0.

While the foregoing invention has been described with some degree of particularity in the specific examples set forth above, it is to be understood that the present invention is not to be limited thereby but rather is only to be limited by the claims appended hereto.

The invention claimed is:

1. A compound having the formula:

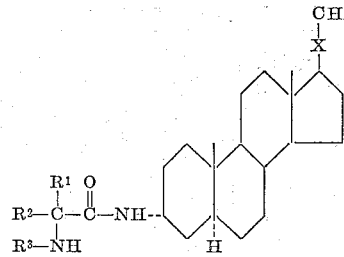

wherein $R^1$ represents a member of the group consisting of hydrogen and lower alkyl; $R^2$ represents a member of the group consisting of hydrogen, lower alkyl, phenyl, lower alkyl phenyl and phenyl lower alkyl; $R^1$ and $R^2$ taken together are cycoalkyl having from 2 to 8 carbon atoms; $R^3$ represents a member of the group consisting of hydrogen, lower alkyl, dialkylaminoalkyl, phenyl, lower alkyl phenyl and phenyl lower alkyl; and X represents a member of the group consisting of

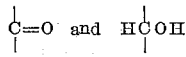

2. 3α-(1-aminocyclopentanecarboxamido)-5α-pregnan-20-one.

3. 3α-(1-aminocyclopropanecarboxamido)-5α-pregnan-20-ol.

4. 3α-(1-aminocyclobutanecarboxamido)-5α-pregnan-20-one.

5. 3α-(1-aminocyclooctanecarboxamido)-5α-pregnan-20-ol.

6. 3α-(2-amino-2-phenylacetamido)-5α-pregnan-20-one.

7. 3α-(2-anilino-2-methylpropionamido)-5α-pregnan-20-ol.

8. 3α-(2-ethylamino-2-phenylacetamido)-5α-pregnan-20-ol.

9. 3α-(2-anilinoacetamido)-5α-pregnan-20-one.

10. The method of preparing 3α-(carboxamido)-5α-pregnan-20-one which comprises reacting 2,5-oxazolidinedione with funtumine in the presence of an inert solvent and recovering the desired product.

11. The method of preparing 3α-(carboxamido)-5α-pregnan-20-ol which comprises reacting 2,5-oxazolidinedione with funtumidine in the presence of an inert solvent and recovering the desired product.

No references cited.

LEWIS GOTTS, *Primary Examiner.*